INVENTORS
CHARLES W. MOULTON,
MICHAEL HACSKAYLO
& CHARLES FELDMAN

BY *Hurwitz & Rose*

ATTORNEYS

United States Patent Office 3,375,135
Patented Mar. 26, 1968

3,375,135
GALVANIC CELL WITH THIN METAL ELECTRODE
AND METHOD OF MAKING SAME
Charles W. Moulton, Columbus, Ohio, and Michael
Hacskaylo, Falls Church, and Charles Feldman,
Alexandria, Va., assignors to Melpar, Inc., Falls
Church, Va., a corporation of Delaware
Filed June 4, 1965, Ser. No. 461,470
16 Claims. (Cl. 136—6)

ABSTRACT OF THE DISCLOSURE

A thin film galvanic cell and method of fabrication thereof comprising an insulating substrate, a first metal electrode layer deposited on the substrate, a thin film electrolyte layer of a solid salt of said metal deposited on said first metal layer, a second solid electrolyte layer of a salt of a second metal deposited on said first electrolyte layer, and a layer of said second metal forming an electrode deposited on said second electrolyte layer. Each of said layers is deposited on the preceding layer by vacuum deposition techniques at succeedingly reduced temperatures, all of the deposition steps being carried out in the same vacuum without exposure of the substrate to an atmosphere containing an oxidizing agent. The cell may be activated either by applying a reverse charge current to the electrodes or by subjecting the cell to an environment having an elevated temperature to promote galvanic current flow between the electrodes. A portion of the upper electrode is deposited so as to be in contact with the substrate, isolated from the first electrode by the electrolyte layers, whereby a substantially planar load circuit for the cell may be deposited on the substrate in contact with both electrodes.

---

The present invention relates generally to thin film galvanic cells and more particularly to a thin film galvanic cell having plural, stacked discrete salt thin film layers.

Thin film electronic circuits comprise an insulating substrate on which are deposited layers of conducting, semi-conductor and insulating materials to form desired circuit configurations. The layers are very thin, having thicknesses never greater than approximately 100 microns. In the prior art, these circuits have usually been activated by power supplies external to the substrate, an arrangement that is beset with many disadvantages.

One configuration proposed by the prior art for providing a thin film battery involves deriving galvanic currents by passing a hydrating medium through a solid metal electrode, so thin that it is porous to water molecules. While this prior art battery functions admirably, the requirement for water is an appreciable deterrent to the use thereof.

Another suggestion has appeared in the prior art to form a film battery by depositing on opposite sides in a channel of an insulator, separate lead and silver electrodes. The gap in the channel between these electrodes was reported as being bridged with a salt, either lead chloride or silver chloride layer. In response to a D.C. charging current applied between the electrodes of both configurations, it is indicated that a layered device of silver-silver chloride-lead chloride-lead was formed. The formation of silver chloride and lead chloride layers from the body of the single salt, either silver chloride or lead chloride, was apparently due to the mass transport phenomena, whereby metal and chloride ions migrate from the salt into the adjacent metal layers. After the charging current was removed, a potential of 0.44 volt was reported at being measured, with a positive voltage at the silver electrode and a negative voltage at the lead electrode. As reported, the cell potential remained approximately at 0.44 voltage until the total charge applied to the cell was dissipated into an external circuit, after which it dropped to substantially zero. When the cell voltage dropped to zero, the silver chloride and lead chloride layers disappeared and only the originally deposited salt was found between the electrodes. Upon recharging, the potential between the electrodes again became 0.44 volt; the charging and recharging operation could be conducted numerous times.

In attempting to duplicate the results previously reported, we were unable to fabricate a cell having the described characteristics. We subscribe as one of the reasons for our inability the inherent difficulty involved in forming a layer that gives rise to thin film ionic conduction between the electrodes on opposite sides of a channel. We found it extremely difficult to provide a channel having the required extremely narrow gap and uniformity of gap cross section.

By experimentation, however, we found that a stacked relationship of discrete layers of: a solid first metal electrode; a salt of the first metal; a salt of a second metal; and the second metal electrode produced a galvanic cell that overcomes the erratic results found to exist with the prior art channel forming approach. The four discrete solid films were formed utilizing vacuum vapor deposition techniques wherein: a first electrode is deposited on the face of an insulating substrate; deposition of the first electrode is followed by depositing a salt that covers it; then a second salt is deposited to cover the first salt; and finally a second electrode is deposited on top of the second salt.

Because two discrete salt layers are deposited, in contrast with the deposition of a single salt in the prior art, we have found no requirement to exist for a charging current to effect mass transport from the salt into the metal and vice versa. Instead, the cell, as fabricated in many instances, provides a voltage on the same order of magnitude as disclosed by the prior art.

In other cells we fabricated, wherein effective electrochemical contact between the layers was not found to exist, it was necessary to pass a very small current, on the order of a nanoampere (1 nanoampere = $10^{-9}$ amperes). This small current is passed through the cell for a sufficient time period to provide contact, as required, between the several layers. The current applied to the cell appears to produce appropriate electrochemical couples between the various layers by transporting a small quantity of mobile metal and halogen ions, in the case of halogen salt layers, across the blocking interfaces between the layers. The activating current we employed is considerably less than and produces an effect different from the prior art, judging from the data collected which indicates that the total charge derived from the cell is considerably greater than the charge applied thereto.

The cells formed appear to have the basic properties of a galvanic cell, even though one of the usual requirements for such cells, the inclusion of a liquid or molten electrolyte, is not met. Thus, in cells having successive layers of Pb—$PbCl_2$—AgCl—Ag, it is found that potentials between 0.47 and 0.50 volt are derived, values that compare very favorably with the theoretical value, from the electromotive series, of 0.49 volt. Similarly, cells having layers silver-silver bromide-lead bromide-bromide produced galvanic potentials between 0.33 and 0.35 volt, again results favorably comparable with the theoretical value of 0.355 volt. It has also been found that the cells can be recharged after great numbers of electrons have been transferred from them to an external circuit. These characteristics of a galvanic cell in a solid body are believed to occur in response to mass transport of ions in the extremely narrow thin film layers. The layers are so thin that the movement of their boundary in response to mass transfer is a significant percentage of the thickness thereof.

Another feature of the cell of the present invention resides in its ability to resume the derivation of D.C. potentials after its output has dropped nearly to zero, without the application of a charging current. If the cell has been operated for a fairly long time period and is thereafter allowed to rest for a sufficient time, it becomes rejuvenated under many operating circumstances. Rejuvenation can occur if operation of the cell results in polarization such that internal changes are established to prevent additional ion migration. Resting the cell allows the accumulated charge to be dissipated, allowing additional mass transport, whereby significant voltages and currents are again derived.

It is, accordingly, an object of the present invention to provide a new and improved thin film source of D.C. potential and method of making same.

Another object of the invention is to provide a thin film source of galvanic potential in which voltages are derived for prolonged time periods without the successive application of charging currents to establish discrete layers.

A further object of the invention is to provide a new and improved thin film galvanic cell that is capable of operation for prolonged time periods without external excitation, either from an electrical source or in the form of a liquid electrolyte.

Another object of the present invention is to provide a thin film galvanic cell that is manufactured to have two discrete salt layers so that voltage can be spontaneously derived from it without the application of an appreciable charging current.

An additional object of the invention is to provide a new and improved, thin film, stacked galvanic cell wherein consistent results are readily obtained by employing standard and facile fabricating techniques.

A further object of the invention is to provide a relatively large capacity thin film galvanic cell that can be depolarized readily by allowing it to rest for a sufficient time period.

Still another object of the invention is to provide a method for activating thin film galvanic cells having a pair of salt layers formed between a pair of electrodes by bringing the layers into effective electrochemical contact.

The above and still further objects, features and advantages of the present invention will become apparent upon consideration of the following detailed description of one specific embodiment thereof, especially when taken in conjunction with the accompanying drawings, wherein:

FIGURE 3 is the decay characteristic of a

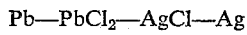

Figure 4:
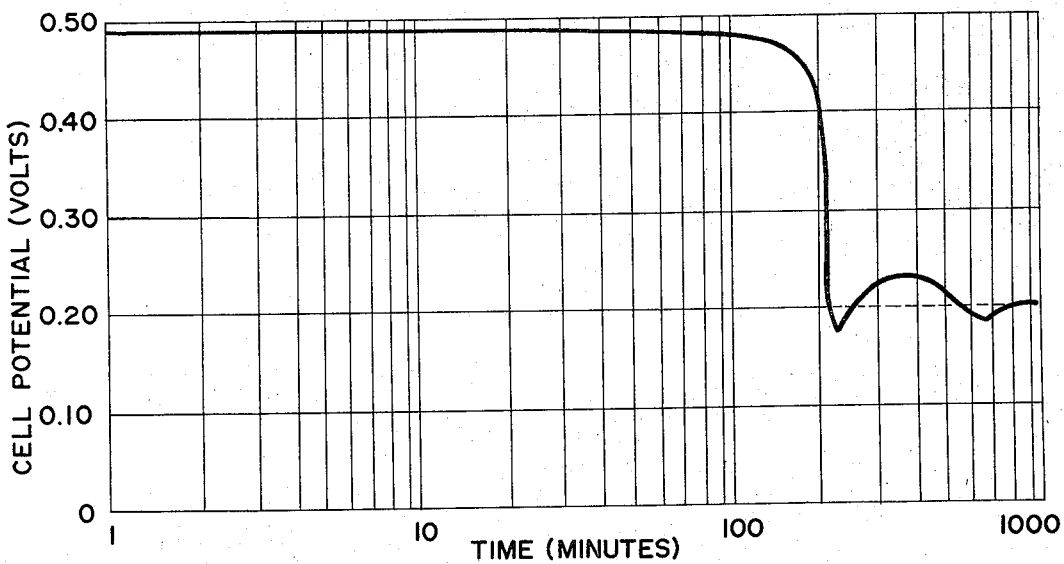

cell having an internal impedance of $10^8$ ohms across a resistive load of $3 \times 10^6$ ohms:

FIGURE 4 is the decay characteristic of a

Figure 5:
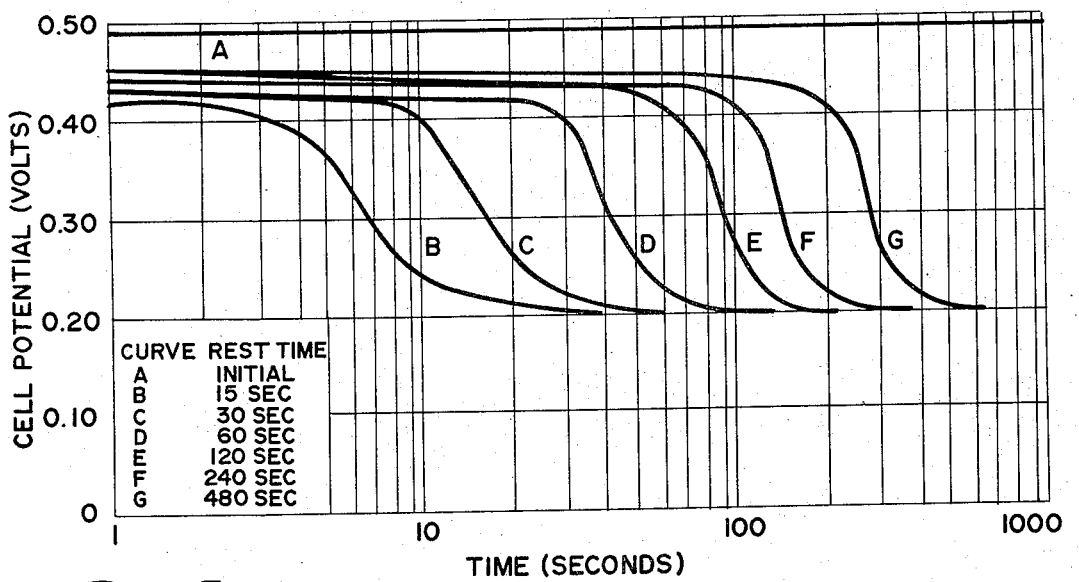

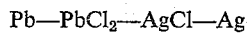

cell having an internal impedance of $4 \times 10^4$ ohms across a resistive load of $10^6$ ohms; and FIGURE 5 shows decay characteristics of another

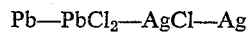

cell as a function of recovery time.

Figure 1:
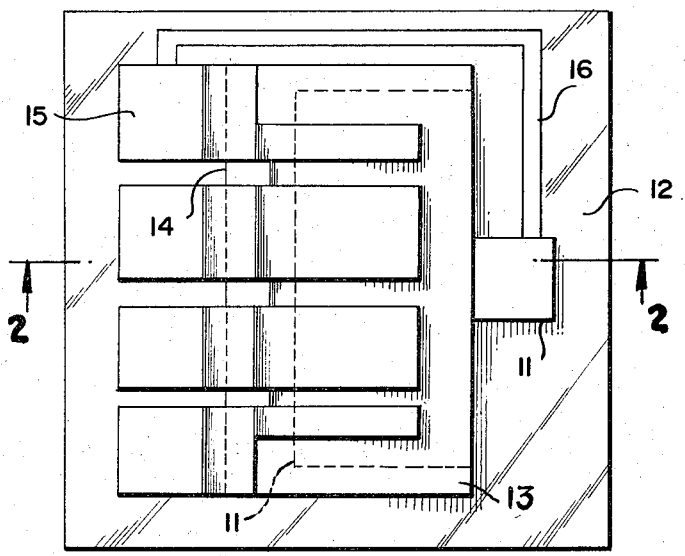
FIGURE 1 is a top view of a preferred embodiment of the present invention.
Figure 2:
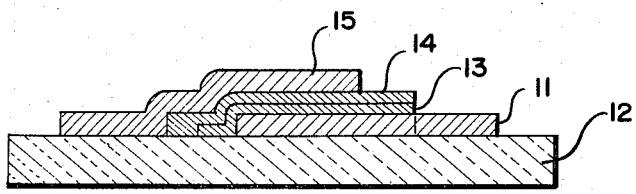
FIGURE 2 is a side sectional view of one embodiment of the present invention, taken through the lines 2—2 of FIGURE 1.

Reference is now made to FIGURES 1 and 2 wherein there is illustrated a thin film galvanic cell having a silver positive electrode 11 (the electrode that supplies positive current to the external circuit) deposited on the surface of insulating glass or quartz substrate 12. Immediately above electrode 11 is deposited salt layer 13 of silver chloride (AgCl), on top of which is further salt layer 14 of lead chloride ($PbCl_2$). In contact with and above salt layer 14 is deposited the negative electrode of the cell, lead layer 15. Each of layers 11 and 12–15 has a thickness on the order of 2.2 to 20 microns, whereby solid state ionic conduction through them occurs.

As viewed in FIGURE 1, four separate cells are formed having in common electrode 11 (shown in phantom) as well as salt layers 13 and 14. Plated on layer 14 are four separate lead electrodes 15 that form negative electrodes for the four cells formed. The effective areas of the two center and two outer cells are respectively on the order of 20 mm.$^2$ and 10 mm.$^2$.

Deposited between electrodes 11 and 15 on substrate 12 is an external load circuit, shown for purposes of example as thin film resistive layer 16. Thus, the load circuit driven by the battery is on the same substrate as the cell so no special thin film connection techniques are involved in applying power to a thin film circuit.

In forming the cells, substrate 12 is initially heated by a resistive heater to 150° C. in a vacuum vapor deposition chamber maintained at 1 to $4 \times 10^{-6}$ mm. of mercury. Layer 11 is then deposited with substrate 12 at the elevated temperature and is then annealed for five minutes by maintaining the substrate at 150° C. The temperature of substrate 12 is then reduced to 135° C., at which time salt layer 13 is vacuum vapor deposited. Layer 13 is also annealed for about five minutes by maintaining the substrate temperature constant. The temperature of substrate 12 is again reduced to 95° C., layer 14 is deposited and then annealed for five minutes as in the previous steps. Thereafter, substrate temperature is reduced to approximately 70° C. and electrode 15 is deposited, followed by the same annealing operation as for the other layers. Subsequent to the last annealing step, each of which is employed to fix the particular layer in place to promote electrical and mechanical stability thereof, the substrate is allowed to cool to a temperature below 40° C., after which it is removed from the chamber.

In the devices actually fabricated, each of layers 11 and 12–15 is deposited at a uniform rate between about 40 and 50 A./sec. for approximately five minutes to provide thicknesses ranging between 2.2 and 20 microns. The entire operation is conducted within the vacuum chamber, without exposure to detrimental oxidation effects. The areas and planar configurations of the layers deposited are determined by masks, in a manner well known to those skilled in the art, whereby different masks are successively positioned between the evaporant source and the substrate from outside the chamber. After the cell has been formed, resistive layer 16 is vacuum deposited by using conventional prior art techniques and resistive materials.

Many of the devices as removed from the vacuum chamber were found to exhibit D.C. potentials of between 0.46–0.50 volt across electrodes 11 and 15.

To activate some of the other cells requires the application of a very small reverse current (applied so it flows through the cell from positive electrode 11 to negative electrode 15), on the order of 4 to 10 nanoamperes, for two to seven hours. We postulate that this slight current transports mobile chlorine and silver ions ($Cl^-$ and $Ag^+$) across the interfaces between layers 11 and 13 and 14–15, respectively. Mobilization of these ions brings the layers into electrochemical contact to provide output voltages agreeing with theoretical electromotive considerations. Our conclusions are predicated upon the finding that the charge applied by the activating current source is considerably less than the charge delivered by the cell to an external circuit during operation. If the sole mechanism that occurred in response to the activating current was to effect a mass transfer to produce current flow, the total input and output currents would be alike.

We have also found that cells which do not spontaneously produce an output voltage can be activated by heating them to temperatures between 170° C. and 310° C. for one to one and a half hours. Thermally activated Ag—AgCl—PbCl$_2$—Pb cells, in every case, were found to provide output potentials of about 0.5 volt. Apparently, the higher temperatures promote increased ionic mobility to provide a more rapid ionic diffusion across the interfaces between the various layers. The increased ionic diffusion rates enable sufficient mass transfer to produce the desired galvanic currents and voltages. Hence, for cells having relatively thick layers (on the order of 20 microns), hence relatively large delivering capacity during use, heating provides increased ionic mobility in cases where galvanic action would not otherwise occur.

Apparently, thermal and electrical activation of many of the cells is necessary because contaminants form on the films during the fabrication process despite extreme efforts to keep the vacuum chamber free from impurities. The impurities, generally due to residual gases in the vacuum chamber, are formed as intervening contaminated layers between layers 11 and 13–15. The contaminated layers establish blocking junctions to prevent the necessary degree of electrolytic contact between the films having the desired materials. Apparently, the slight back current applied to the cell breaks down the blocking junctions to provide the necessary electrolytic contact. In contrast, heating the cells seems to produce sufficient anions and cations to enable the derivation of galvanic currents and voltages in the cell despite the blocking junctions.

During discharge of the cell, lead in layer 15 is ionized to Pb$^{++}$ by mass transport of 2Cl$^-$ in layer 14 toward the negative lead electrode. The ionized lead gives off two electrons to the external circuit, leaving a residue of metallic lead in layer 15. The electrons flowing through the external circuit flow into the positive, silver electrode, causing reduction of silver ions therein, due to mass transport of layer 11 into AgCl salt layer 13. Mass transfer of layer 11 into layer 13 occurs because the boundary of the latter moves into PbCl$_2$ salt layer 14 in response to movement of Cl$^-$ ions from layer 13 to 14. Thus, the reaction at electrodes 11 and 15 are respectively expressed as:

$$2Ag^+ + 2e^- \rightarrow 2Ag$$

$$Pb \rightarrow Pb^{++} + 2e^-$$

while the entire cell reaction is:

$$Pb + 2AgCl \rightarrow PbCl_2 + 2Ag$$

Figure 3:
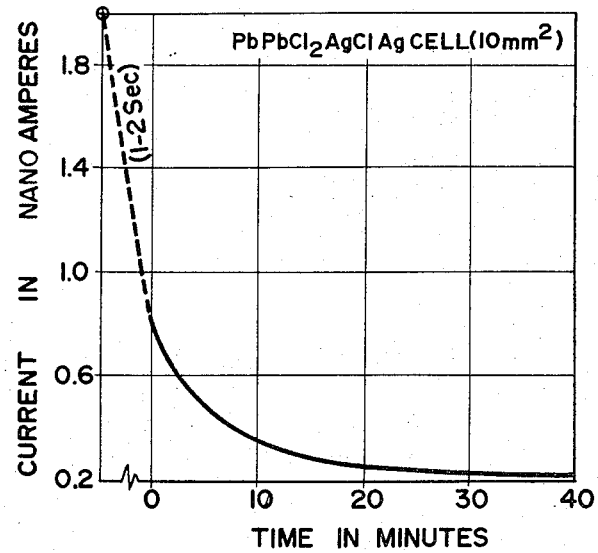

Experimental data collected from a number of typical Ag—AgCl—PbCl$_2$—Pb samples are presented in FIGURES 3–5. FIGURE 3 is a curve depicting the discharge current for one of the cells under short-circuit load conditions. The current is seen to drop rapidly (within seconds) from an original reading of aproximately 2 na. to about 0.8 na., and then to decrease slowly, approaching 0.2 nanoampere in some 40 minutes. These data indicate an internal cell resistance of the order of 10$^8$ ohms. The limiting current is undoubtedly governed by the rate of the ionic diffusion.

Results of the variation in cell potential during discharge into a one megohm resistive load of another typical Ag—AgCl—PbCl$_2$—Pb cell are shown in FIGURE 4, a plot of voltage as a function of the logarithm of time in minutes. A drop to 0.48 volt occurred in the first 100 minutes. The rate of decrease of the voltage thereafter increased rapidly. After 200 minutes, the value was 0.40 volt, and after 215 minutes, 0.20 volt. The cell potential remained essentially constant at about 0.20 volt for a period of over 25 hours.

On removal of the load, it was found that the cells recovered, i.e. their voltage again reached a value of approximately 0.50 volt. Subsequent behavior showed a strong dependence on the duration of the rest period. The curves in FIGURE 5 show the variation of cell potentials with time after a sequence of successively increasing rest times. Initial voltage and voltage-decay time is defined, for example, as the time required for the voltage to fall to one-half of the initial value increased with increasing length of rest time. In each case the EMF decreased to a value of about 0.20 volt. Further increases in rest time did not extend the life, and after rests of several hours, the voltage-time curves of FIGURE 4 were repeatable, with the exception that the "initial" cell potential was 0.45 volt rather than 0.49 volt. A second cell exhibited electrical characteristics similar to the first, except that lifetimes were shorter by about half a magnitude and the decayed voltage level was 0.10 volt rather than 0.20 volt. However, the EMF of all the cells remained constant at the low voltage after life tests of about 60 hours.

Apparently, during prolonged operation, the cell becomes polarized whereby charges are established between the layers to preclude significant galvanic current flow. By resting the cell, the charges are dissipated through the external circuitry and leakage resistances so that galvanic currents can again be produced.

After prolonged discharge the cell of the present invention, like any galvanic cell, becomes discharged, whereby layer 13 becomes virtually depleted of chloride ions. To recharge the cell, reverse current is supplied to it such that an external source causes electrons to be supplied to and withdrawn from electrodes 15 and 11, respectively. The recharging current is supplied to the cell for a sufficient time period to reform layer 13 with a thickness approaching its original value.

While the cell has heretofore been described solely as an Ag—AgCl—PbCl$_2$—Pb unit, it is to be understood that any salts and metals having appropriate spacings on the electromotive series can be employed. Since the salts preferably rely on ionic, rather than electronic conduction, i.e. are materials of high, rather than low-resistivity, halogen salts are deemed the most practical. The silver and lead halides are believed to be of greatest interest since they, with the exception of lead iodide (PbI$_2$), exhibit, respectively, complete cationic and anionic conduction at room temperature, 25° C. Thus, cells having layers of silver-silver bromide-lead bromide-lead were formed and found to produce galvanic potentials of 0.33 to 0.35 volt, values that agree favorably with the expected potential of 0.355 volt.

In general, for cells having two solid, halide salt layers sandwiched between lead and silver electrodes the total cell reaction is expressed as:

$$Pb + 2AgX \rightarrow PbX_2 + 2Ag$$

where X is one of the four halogens; fluorine, chlorine, bromine or iodine. The voltages deriving from such cells are:

| X: | Voltage |
|---|---|
| F | 1.29 |
| Cl | 0.490 |
| Br | 0.355 |
| I | 0.213 |

While we have described an illustrated one specific embodiment of our invention, it will be clear that variations of the details of construction which are specifically illustrated and described may be resorted to without departing from the true spirit and scope of the invention as defined in the appended claims. For example, greater voltages and currents can be derived by connecting a plurality of the cells in series or parallel. The series connection can be effected, in the most specifically disclosed embodiment, by stacking a second cell on top of the first cell. In stacking, a silver layer is deposited directly on the lead electrode and the same sequence of steps required to form the first cell is repeated.

We claim:

1. A thin film galvanic cell comprising an insulating substrate having on one side a first metal electrode partially deposited thereon, a solid thin film layer of a salt of said metal deposited on said electrode and in direct contact with the one side of said substrate, a solid thin film layer of a salt of a second metal deposited on said layer of the salt of said first metal and in direct contact with the one side of said substrate, and a layer of said second metal forming another electrode deposited on said layer of the salt of said second metal and in direct contact with the one side of said substrate, said thin film layers being sufficiently thin to allow solid state ionic conduction through them.

2. A thin film galvanic cell comprising an insulating substrate having on one side a first metal electrode partially deposited thereon, a solid thin film layer of a halogen salt of said metal deposited on said electrode and in direct contact with the one side of said substrate, a solid thin film layer of a halogen salt of a second metal deposited on said layer of the salt of said first metal and in direct contact with the one side of said substrate, and a layer of second metal forming another electrode deposited on said layer of the salt of said second metal and in direct contact with the one side of said substrate, said thin film layers being sufficiently thin to allow solid state ionic conduction through them.

3. The cell of claim 2 wherein said first and second metals are silver and lead, respectively.

4. The cell of claim 3 wherein said salt is a chloride.

5. A method of fabricating a thin film galvanic cell on an insulating substrate comprising vacuum vapor depositing a first metal layer on said substrate as an electrode for said cell, vacuum vapor depositing a first, solid salt layer of said first metal on said electrode, vacuum vapor depositing a second, solid salt layer of a second metal on said first salt layer, vacuum vapor depositing said second metal on said second salt layer as a second electrode for the cell, each of said vacuum depositing steps being carried out in the same vacuum without exposure of the substrate to an atmosphere containing an oxidizing agent from the time deposition of the first electrode begins to the time deposition of the second electrode has ceased, whereby blocking layers are formed at the interfaces between said layers in response to contaminants impinging on the layers and the layers are not in electrochemical contact, and activating the cell by bringing the layers into electrochemical contact.

6. The method of claim 5 wherein said cell is activated by applying a reverse current to the electrodes of the cell.

7. The method of claim 6 wherein said first and second metals are silver and lead, respectively, said first and second salts are silver chloride and lead chloride, respectively, and said current has a density on the order of 0.2 to $1 \times 10^{-9}$ amperes per mm.$^2$ and is applied to said cell for a period between two and seven hours.

8. The method of claim 5 wherein said cell is activated by subjecting the completed cell to an environment having an elevated temperature to promote galvanic current flow between the interfaces.

9. The method of claim 8 wherein said first and second metals are silver and lead, respectively, said first and second salts are silver chloride and lead chloride, respectively, and said temperature is in the range from 170° C. to 310° C.

10. A thin film galvanic cell comprising an insulating substrate having a first metal electrode bonded to the upper planar surface of the substrate, a discrete solid thin film layer of a salt of said metal bonded to the upper planar surface of said electrode and to the upper planar surface of the substrate, another discrete solid thin film layer of a salt of second metal bonded to the upper planar surface of said layer of the salt of said first metal and to the upper planar surface of the substrate, and a layer of said second metal forming another electrode bonded to the upper planar surface of said layer of the salt of said second metal and to the upper planar surface of the substrate, wherein each of said thin film layers has a thickness on the order of 2.2 to 20 microns.

11. In combination, an insulating substrate, a thin film galvanic cell on one side of said substrate comprising a first metal electrode partially bonded to said substrate, a solid thin film layer of salt of said metal bonded to said electrode and in direct contact with the one side of said substrate, a solid thin film layer of a salt of a second metal bonded to said layer of the salt of said first metal and in direct contact with the one side of said substrate, a layer of said second metal forming another electrode bonded to said layer of the salt of said second metal and in direct contact with the one side of said substrate, said layers being in electrochemical contact with each other and the electrode adjacent with it, and a thin film load circuit bonded to said substrate connected between the electrodes of said cell.

12. A thin film battery configuration comprising an insulating substrate having a planar surface, a first planar electrode partially bonded to the planar surface of said substrate, solid thin film planar layer means of an electrolytic medium bonded to said first electrode and to the planar surface of said substrate and covering at least a substantial portion of the exposed portion of said first electrode, a plurality of second planar electrodes bonded to said layer means and to the planar surface of said substrate and covering a substantial portion of the exposed surface of said layer means and overlying said first electrode.

13. The battery configuration of claim 12 wherein said layer means comprises a pair of separate metal salt layers.

14. In combination the thin film galvanic cell according to claim 1 and a thin film load circuit deposited on said substrate and connected between the electrodes of said cell.

15. In combination the thin film galvanic cell according to claim 4 and a thin film load circuit deposited on said substrate and connected between the electrodes of said cell.

16. In combination the thin film galvanic cell according to claim 10 and a thin film load circuit bonded to said substrate and connected between the electrodes of said cell.

References Cited

UNITED STATES PATENTS

| | | | |
|---|---|---|---|
| 2,696,513 | 12/1954 | Lehovec | 136—111 |
| 2,793,244 | 5/1957 | Van Der Grinten | 136—111 |
| 3,064,067 | 11/1962 | McLennan | 136—111 |
| 3,170,817 | 2/1965 | Mrgudich | 136—83 |

FOREIGN PATENTS 732,270   6/1955   England.

ALLEN B. CURTIS, *Primary Examiner.*

WINSTON A. DOUGLAS, *Examiner.*

C. F. LE FEVOUR, *Assistant Examiner.*